United States Patent
Baeza-Yates

(10) Patent No.: US 7,668,813 B2
(45) Date of Patent: Feb. 23, 2010

(54) TECHNIQUES FOR SEARCHING FUTURE EVENTS

(75) Inventor: Ricardo Alberto Baeza-Yates, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 275 days.

(21) Appl. No.: 11/463,978

(22) Filed: Aug. 11, 2006

(65) Prior Publication Data
US 2008/0040321 A1 Feb. 14, 2008

(51) Int. Cl.
G06F 7/00 (2006.01)
G06F 17/30 (2006.01)
(52) U.S. Cl. .......................................................... 707/3
(58) Field of Classification Search ...................... 707/3
See application file for complete search history.

(56) References Cited

U.S. PATENT DOCUMENTS 6,631,373 B1 * 10/2003 Otani et al. ..................... 707/5
7,039,631 B1 * 5/2006 Finger, II ........................ 707/3

OTHER PUBLICATIONS

Ricardo Baeza-Yates, Searching the Future, Jan. 2004, Center for Web Research Dept. of Computer Science, University of Chile, 6 pages, Applicant's IDS.*
Ricardo Baeza-Yates, Challenges in the Interaction of Information Retrieval and Natural Language Processing , 2004, Springer Berlin / Heidelberg, vol. 2945/2004, pp. 445-456 (http://www.springerlink.com/content/2c86t1ka6uk62087/).*
Ahmad, P. de Oliveira, P. Manomaisupat, M. Casey, T. Taskaya. Description of Events: An Analysis of Keywords and Indexical Names. In *Proceedings, Third International Conference on Language Resources and Evaluation, LREC 2002: Workshop on Event Modelling for Multilingual Document Linking*, pp. 29-35, 2002.
Allan J., editor. Topic Detection and Tracking: Event-based Information Organization, Kluwer, 2002.
Baeza-Yates, Challenges in the Interaction of Information Retrieval and Natural Language Processing, Technical Report, CS Dept. niversity of Chile, Feb. 2004.
Baeza-Yates, Searching the Future, Technical Report, CS Dept. University of Chile, Jan. 2004.

(Continued)

*Primary Examiner*—Mohammad Ali
*Assistant Examiner*—Alexey Shmatov
(74) *Attorney, Agent, or Firm*—Weaver Austin Villeneuve & Sampson LLP

(57) ABSTRACT

A future retrieval system operable to enable searching for future events associated with a set of documents includes at least one memory device configured to store a database of the documents. The system identifies future events associated with the documents and generates temporal data and a confidence value for each future event. The confidence value represents a likelihood of occurrence for the corresponding future event. The system evaluates text associated with the future events to generate event metadata, and indexes the documents with the associated event metadata, temporal data, and confidence levels in the database. The system generates search results corresponding to selected ones of the documents in the database in response to queries which include references to future times, and ranks the search results in accordance with the confidence values associated with the future events associated with the selected documents.

20 Claims, 5 Drawing Sheets

OTHER PUBLICATIONS

Dale, H. Moisl, and H. Somers, editors. Handbook of Natural Language Processing, Marcel Dekker, NY, 2000.

Date, H. Darwen, and N. Lorentzos. Temporal Data & the Relational Model, Morgan Kaufmann, 2002.

Gregersen, C.S. Jensen. Temporal Entity-Relationship Models-A Survey. *IEEE Transactions on Knowledge and Data Engineering* pp. 464-497, 1999.

Kroha, R. Baeza-Yates. A Case Study: News Classi_cation Based on Term Frequency. *Sixth International Workshop on Theory and Applications of Knowledge Management* (TAKMA 2005), Copenhagen, Denmark, Aug. 2005.

Lavrenko, M. Schmill, D. Lawrie, P. Ogilvie, D. Jensen, and J. Allan. Language models for _nancial news recommendation. In *Proceedings of the ninth international conference on Information and knowledge management,* VA, pp. 389-396, 2000.

Lavrenko, M. Schmill, D. Lawrie, P. Ogilvie, D. Jensen, and J. Allan. Mining of Concurrent Text and Time-Series, In *KDD-2000 Workshop on Text Mining,* Boston, MA, 2000.

Lent, R. Agrawal, R. Srikant. Discovering Trends in Text Databases, In *Proc. 3rd Int. Conf. Knowledge Discovery and Data Mining,* D. Heckerman, H. Mannila, and D. Pregibon, and R. Uthurusamy, editors. AAAI Press, pp. 227.230, 1997.

Macskassy, and F. Provost. Intelligent information triage. In *Proceedings of the 24th annual international ACM SIGIR conference on Research and development in information retrieval,* New Orleans, LA, pp. 318.326, 2001.

Nahm, and R.J. Mooney. Text Mining with Information Extraction. In *Proceedings of the AAA 2002 Spring Symposium on Mining Answers from Texts and Knowledge Bases,* pp. 60-67, Stanford, CA, Mar. 2002.

Pazienza, J.G. Carbonell, and J. Siekmann, editors. Information Extraction: Towards Scalable, Adaptable Systems, LNAI, Springer, 1999.

Pazienza, editor. Information Extraction in the Web Era: Natural Language Communication for Knowledge Acquisition and Intelligent Information Agents, LNAI 1714, Springer, 2003.

Permunetilleke, and R.K. Wong. Currency exchange rate forecasting from news headlines. In *Proceedings of the thirteenth Australasian conference on Database technologies,* vol. 5, pp. 131-139, 2002.

Schilder, and Chr. Habel. Temporal information extraction for temporal question answering. In *Proceedings of the 2003 AAAI Spring Symposium in New Directions in Question Answering,* Stanford University, CA, 2003.

Schilder, Temporal Expressions to Temporal Information: Semantic Tagging of News Messages. *In Proceedings of ACL'01 workshop on temporal and spatial information proceessings,* pp. 65-72, Toulouse, France, 2001.

Tansel, Clifford, Gadia, Jajodia, Segev, and Snodgrass, editors. *Temporal databases: theory, design, and implementation,* Benjamin-Cummings, CA, USA, 1993.

Wuthrich, D. Permunetilleke, S. Leung, W. Lam, V. Cho, and J. Zhang. Daily Prediction of Major Stock Indices from textual WWWData, *HKIE Transactions,* vol. 5, No. 3, pp. 151-156, 1998.

\* cited by examiner

Query:

Year: 2002

| Ranking | Headline | Confidence |
|---|---|---|
| 1. | MUSICIANS ON BROADWAY TO VOTE ON A CONTRACT | 100% |
| 1. | NEW YORK PLEASED BY HOUSE BILL ON TRANSPORT | 100% |
| 3. | ANALYSIS: TAXING INTERNET SALES_ GOVERNORS VS. TAX FREEDOM ACT | 50% |
| 3. | BUOYANT CLINTON TAKES ON GOP SENATORS, BIG TOBACCO | 50% |
| 3. | SMITHSONIAN FIRES ARCHITECT OF NATIONAL INDIAN MUSEUM | 50% |

FIG. 3

Query: billion

Year: 1999-2000

| Ranking | Headline | Confidence |
|---|---|---|
| 1. | NEW YORK PLEASED BY HOUSE BILL ON TRANSPORT | 100% |
| 2. | ANALYSIS: TAXING INTERNET SALES_ GOVERNORS VS. TAX FREEDOM ACT | 50% |
| 2. | BUOYANT CLINTON TAKES ON GOP SENATORS, BIG TOBACCO | 50% |
| 2. | CREDIT WARNING BY MOODY'S ON JAPANESE BONDS | 50% |

FIG. 4

Query: Kenya OR Malaysia

Year: 1998

| Ranking | Headline | Confidence |
|---|---|---|
| 1. | MALAYSIA | 100% |
| 1. | MALAYSIA | 100% |
| 1. | SECURITY COUNCIL MEMBERS EXPRESS NEED FOR POLITICAL WILL TO HELP | 100% |
| 4. | KENYANS PROTEST TAX HIKES | 50% |

FIG. 5

TECHNIQUES FOR SEARCHING FUTURE EVENTS

BACKGROUND OF THE INVENTION

The present invention relates to searching electronic documents and, in particular, to techniques for searching such documents for future events.

Humans have always wanted to know their future, resorting to religious texts, astrology, fortune tellers, etc. Although we cannot know the future, a lot can be predicted about it because many things are planned several years in advance.

The expression "searching the future" has been used recently for what is called prospective search. For example, in a publish/subscribe model, people can subscribe to topics of interest (sometimes expressed as queries), which then are matched to any new published information. That is, as new information relating to a topic of interest is published, the subscriber is notified in some way. For example, www.pubsub.com offers this service for over 13 million sources. Unfortunately, such models are inadequate to be applied in a predictive fashion. That is, such techniques merely apply conventional search techniques at various future times to obtain results. They are not intended to mine existing data with regard to upcoming events.

In view of the foregoing, techniques are needed for enabling the searching of electronic documents for future events.

SUMMARY OF THE INVENTION

According to a specific embodiment of the present invention, a future retrieval system is provided which is operable to enable searching for future events associated with a set of documents. At least one memory device is configured to store a database which includes the documents. At least one computing device is configured to identify future events associated with the documents and to generate temporal data and a confidence value for each future event. The confidence value represents a likelihood of occurrence for the corresponding future event. The at least one computing device is further configured to evaluate text associated with the future events to generate event metadata, and to index the documents with the associated event metadata, temporal data, and confidence levels in the database. The at least one computing device is further configured to generate search results corresponding to selected ones of the documents in the database in response to queries which include references to future times, and to rank the search results in accordance with the confidence values associated with the future events associated with the selected documents.

According to another specific embodiment, methods and apparatus are provided for enabling a user to search for future events associated with a plurality of documents. A search interface is presented with which the user may generate a query which includes a reference to a future time. A results interface is presented which includes search results corresponding to selected ones of the documents in response to the query. The search results are ranked in accordance with confidence values associated with future events associated with the selected documents, each confidence value representing a likelihood of occurrence for the associated future event. According to a more specific embodiment, the query includes one or more keywords, and the search results are also ranked in accordance with relevance of the selected documents with respect to the one or more keywords.

A further understanding of the nature and advantages of the present invention may be realized by reference to the remaining portions of the specification and the drawings.

BRIEF DESCRIPTION OF THE DRAWINGS

FIGS. 3-5 are exemplary representations of search results presented in accordance with a specific embodiment of the invention.

DETAILED DESCRIPTION OF SPECIFIC EMBODIMENTS

Figure 1:
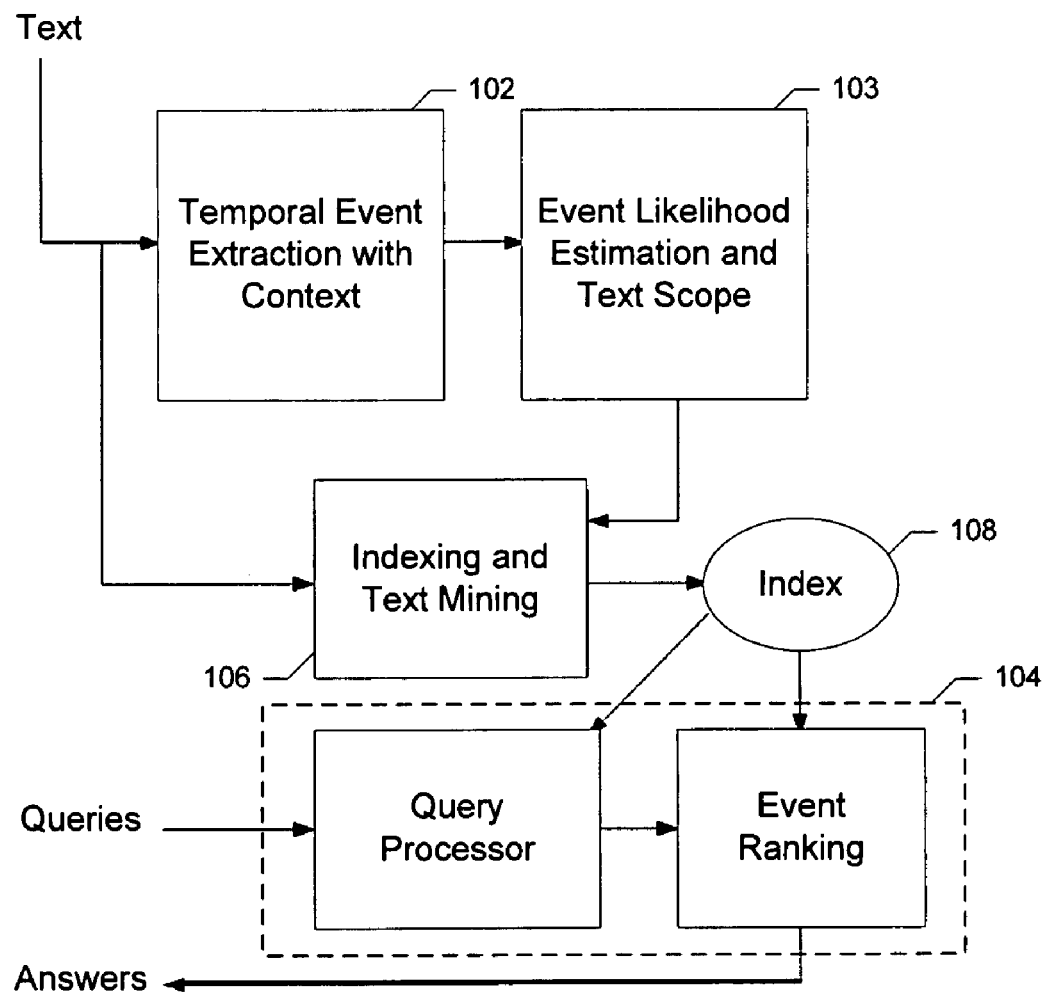
FIG. 1 is a simplified block diagram illustrating interaction among the components of a future retrieval system in accordance with a specific embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the present invention, techniques are provided which enable exploration of event spaces for events scheduled in the future. As will be understood this type of searching can support decision making in many different fields and at many different levels. Specific embodiments are described below which refer specifically to news documents available on the World Wide Web. However, it should be noted that the present invention is not so limited, and may be applied to a wide variety of data sets.

According to the invention, a new retrieval paradigm is defined and referred to herein as "future retrieval." According to one class of embodiments, news information is used to obtain possible future events, and then these events are made searchable with reference to current (or future) information needs. According to a specific embodiment, time is included as a formal attribute for a document. An exemplary ranking model based on time segments is described herein along with some specific examples.

According to this class of embodiments, future retrieval involves extracting temporal information from news documents and combining it with standard full-text retrieval to answer queries that mix text and time. The feasibility and operation of a such future retrieval system is illustrated herein using news data processed to extract temporal entities, a simple probability model for future events, a model based on a set of time segments, and a generic simple ranking extension to any information retrieval model. Exemplary results from such a system are also provided which serve as a proof-of-concept of the feasibility and usefulness of future retrieval.

As mentioned above, and according to a specific embodiment of the invention, the main sources for knowledge about future events are news items. By looking at future years in any web-based news service, e.g., Yahoo! News, it is possible to find many thousands of articles, a significant percentage of which include the year in the headline, and some of which include references into the next century or beyond. An exemplary sample from a web-based news service on Dec. 1st, 2003, included more than one-hundred thousand references to years 2004 and beyond. About 80% of the references related to the immediate future (e.g., within days, weeks, or a few months) and, on average, more than one future reference was included per article. We estimated that there were at least half a million references to future events in the sample. Assuming that there is a ten-fold repetition redundancy (i.e., similar articles in different newspapers), this yielded an estimate of about fifty thousand unique articles about the future. A similar analysis only on headlines gave around 10% of that number.

In a sample taken from the same news service on Jul. 15, 2005, the number of references to years 2006 or later was over 250 thousand. For example, for the year 2034, news items relating to the following topics were included in a sample of almost 100 news items: (1) The license of nuclear electric plants in Arkansas and Michigan will end; (2) The ownership of Dolphin Square in London must revert to an insurance company; (3) Voyager 2 should run out of fuel; (4) Long-term care facilities may have to house 2.1 million people in the USA; and (5) A human base in the moon would be in operation. So, when searching for "energy" or "health" in the future, a future retrieval system should return, for example, items 1 and 4, preferably classified by year. On the other hand, when searching for "2034" and "space," the system should return items 3 and 5. A specific implementation of a future retrieval system designed to function in this manner will now be described.

The primary components of a future retrieval system designed according to a specific embodiment of the present invention are shown in FIG. 1. An information extraction (IE) subsystem 102 recognizes temporal expressions, e.g., times, dates, and durations (a particular kind of named entity recognition). Subsystem 103 quantifies the likelihood of the corresponding future events. For example, news items 1 and 2 above will most probably happen, while items 3 to 5 might have lower probabilities of happening. Subsystem 103 also identifies the text in the document relevant to that event (i.e., the text scope of the event).

An information retrieval (IR) subsystem 104 allows text queries, and optionally specification of a time segment such as, for example, the specification of the year 2034 as described above. Given a time segment, IR system 104 finds the most important topics and/or likely events associated with that segment. These topics and/or events are identified by the text mining and indexing subsystem 106. Any conventional information retrieval ranking technique may be extended in the time dimension, projected to a time segment, and sorted according to textual ranking or time.

Text mining and indexing subsystem 106 indexes articles (i.e., in index 108) together with time segments, confidence levels, and other information (e.g., event metadata, event text scope, etc.). For the example described above, items relating to space travel or NASA would be identified for the year 2034.

According to a specific embodiments, the IE subsystem 102 may be configured to recognize temporal expressions primarily with reference to dates. That is dates may be more readily recognizable and so may be given greater importance than times or durations. According to a specific embodiment, subsystem 103 may be configured to identify the tense and/or mood of the main verb(s) associated with an event to determine a confidence level for the occurrence of the event, as well as the text relevant to that event (i.e., text scope of the event). For example, subsystem 103 may be configured to distinguish the terms "will" and "must" from "should," "could," and "would," and assign different confidence levels accordingly. More sophisticated natural language processing techniques may be applied to both of these functionalities.

According to a specific embodiment, the IR system associates time segments or the equivalent with documents, and defines how to combine any information retrieval ranking scheme with these time segments.

Embodiments of the present invention build on previous work in several areas including temporal databases, temporal entity recognition, text mining (in particular information extraction from news), and stock prediction. And although none of those areas has yet focused on searching the future based on news text, each provides useful tools for the exemplary system described herein.

The field of temporal databases is a well-established field in the database community that deals with the problem of storing data that includes time information. Some techniques in the field include manipulating and reasoning about time based data. See, for example, A. Tansel, J. Clifford, S. Gadia, S. Jajodia, A. Segev, and R. Snodgrass, editors; *Temporal databases: theory, design, and implementation*, Benjamin-Cummings, Calif., USA, 1993, and C. J. Date, H. Darwen, and N. Lorentzos; *Temporal Data & the Relational Model*, Morgan Kaufmann, 2002, the entire disclosures of which are incorporated herein by reference for all purposes.

According to a specific embodiment, a set of time segments model is employed which may be based on several of nearly a dozen temporally enhanced entity-relationship models available. See, for example, H. Gregersen, C. S. Jensen. *Temporal Entity-Relationship Models-A Survey*. IEEE Transactions on Knowledge and Data Engineering pp. 464-497, 1999, the entire disclosure of which is incorporated herein by reference for all purposes.

Entity recognition is a well defined task in natural language processing (NLP). See for example, R. Dale, H. Moisl, and H. Somers, editors; *Handbook of Natural Language Processing*, Marcel Dekker, N.Y., 2000, the entire disclosure of which is incorporated herein by reference for all purposes. Temporal entities are one of the most important elements and are difficult to extract completely. See, for example, K. Ahmad, P. de Oliveira, P. Manomaisupat, M. Casey, T. Taskaya; *Description of Events: An Analysis of Keywords and Indexical Names*. In Proceedings of the Third International Conference on Language Resources and Evaluation, LREC 2002: Workshop on Event Modelling for Multilingual Document Linking, pp. 29-35, 2002, the entire disclosure of which is incorporated herein by reference for all purposes. However, using state-of-the-art techniques, more than 90% of them can be extracted. See for example F. Schilder, and Chr. Habel. *Temporal information extraction for temporal question answering*, In Proceedings of the 2003 AAAI Spring Symposium in New Directions in Question Answering, Stanford University, Calif., 2003, the entire disclosure of which is incorporated herein by reference for all purposes.

This problem is also important for tagging news itself. See for example, F. Schilder, and Chr. Habel; *From Temporal Expressions to Temporal Information: Semantic Tagging of News Messages*, In Proceedings of ACL'01 workshop on temporal and spatial information processing, pp. 65-72, Toulouse, France, 2001, the entire disclosure of which is incorporated herein by reference for all purposes. A related problem is information triage which refers to the task of monitoring a variety of information sources (e.g. news stories, email, stock-prices) and providing users with a well-filtered, prioritized, and ranked set of information items. See for example, S. Macskassy, and F. Provost. *Intelligent information triage*. In Proceedings of the 24th annual international ACM SIGIR conference on Research and development in information retrieval, New Orleans, La., pp. 318.326, 2001, the entire disclosure of which is incorporated herein by reference for all purposes. However, information triage focuses on relating different sources and ranks news based on its present importance, while learning from the data.

Text mining and information extraction have developed in the recent years (see, generally, M. T. Pazienza, J. G. Carbonell, and J. Siekmann, editors; *Information Extraction: Towards Scalable, Adaptable Systems*, LNAI, Springer, 1999; and M. T. Pazienza, editor. *Information Extraction in the Web Era: Natural Language Communication for Knowledge Acquisition and Intelligent Information Agents*, LNAI 1714, Springer, 2003, the entire disclosures of which are incorporated herein by reference for all purposes), including discovering trends (see, for example, B. Lent, R. Agrawal, R. Srikant; *Discovering Trends in Text Databases*, In Proc. 3rd Int. Conf. Knowledge Discovery and Data Mining, D. Heckerman, H. Mannila, and D. Pregibon, and R. Uthurusamy, editors. AAAI Press, pp. 227.230, 1997; and U. Y. Nahm, and R. J. Mooney; *Text Mining with Information Extraction*, In Proceedings of the AAAI 2002 Spring Symposium on Mining Answers from Texts and Knowledge Bases, pp. 60-67, Stanford, Calif., March 2002, the entire disclosures of which are incorporated herein by reference for all purposes), as well as topic extraction (see for example, J. Allan, editor. *Topic Detection and Tracking: Event-based Information Organization*, Kluwer, 2002, the entire disclosure of which is incorporated herein by reference for all purposes). There is useful work on language models for news recommendation (see for example, V. Lavrenko, M. Schmill, D. Lawrie, P. Ogilvie, D. Jensen, and J. Allan. *Language models for financial news recommendation*. In Proceedings of the ninth international conference on Information and knowledge management, VA, pp. 389-396, 2000, the entire disclosure of which is incorporated herein by reference for all purposes), as well as mining at the same time text and time-series (see for example, V. Lavrenko, M. Schmill, D. Lawrie, P. Ogilvie, D. Jensen, and J. Allan. *Mining of Concurrent Text and Time-Series*, In KDD-2000 Workshop on Text Mining, Boston, Mass., 2000, the entire disclosure of which is incorporated herein by reference for all purposes.

There is some work on predicting the future, in particular related to the stock market. In this case the input is numerical data rather than text data, and the prediction should help to decide what actions to take (e.g., sell, buy, etc.). Recent work has included the use of text as well as time-series for exchange rate forecasting from news headlines (See for example, D. Permunetilleke, and R. K. Wong. *Currency exchange rate forecasting from news headlines*. In Proceedings of the thirteenth Australasian conference on Database technologies, Vol. 5, pp. 131-139, 2002; and P. Kroha, R. Baeza-Yates. *A Case Study: News Classification Based on Term Frequency*. Sixth International Workshop on Theory and Applications of Knowledge Management (TAKMA 2005), Copenhagen, Denmark, August 2005, the entire disclosures of which are incorporated herein by reference for all purposes) or predicting daily stock indices using Web data (see for example, B. Wuthrich, D. Permunetilleke, S. Leung, W. Lam, V. Cho, and J. Zhang. *Daily Prediction of Major Stock Indices from textual WWWData*, HKIE Transactions, Vol. 5, No. 3, pp. 151-156, 1998, the entire disclosure of which is incorporated herein by reference for all purposes.

The following description relates to the inclusion of temporal events in documents and the mixing of traditional ranking with temporal events according to an exemplary implementation of the present invention. Any temporal entity e can be represented by a time segment $S=[t_1, t_2]$. The time segment could be open to the future (that is, $t_2=\infty$), but $t_1$ is at least the present, defined as $t_1$=today. We define a temporal event $E_e$ as a tuple $(S_e, C)$ where Se is the time segment associated to the temporal entity e, and C is a confidence probability (or level) that the event will actually happen ($0<C<1$).

A document may have several associated temporal entities. Hence, we associate with a document all temporal events associated with temporal entities in the document. That is, for a document d, we have $$E_d = \cup_{e \in d} E_e \qquad (1)$$

An improvement is to associate each event only to its text scope inside the document. In addition, let $M(V)$ denote the maximum confidence level of a set of events V.

Figure 2:
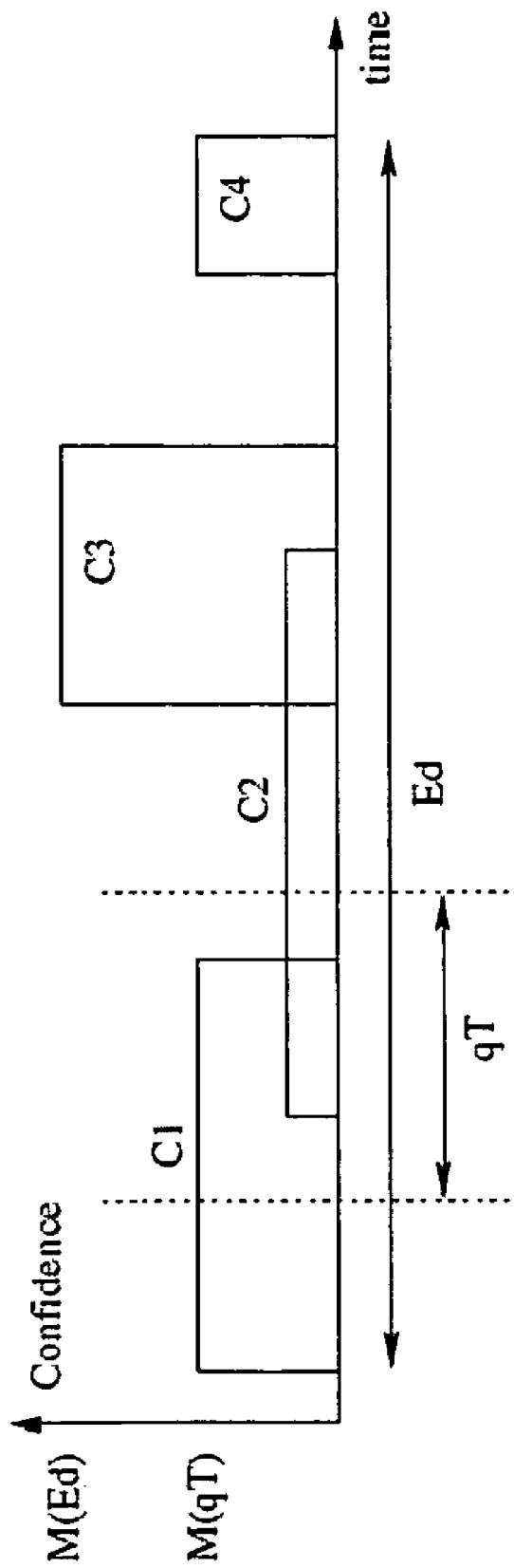
FIG. 2 is an illustration of a time vs. confidence plot for a set of temporal events associated with a document according to a specific embodiment of the invention.

Notice that we can plot time versus confidence of the set $E_d$ by taking the maximum confidence at any time (which is equivalent to using the most probable event if more than one will happen). It should be noted that other ways to combine overlapped events are possible. However, we use this one as an example because it has a reasonable meaning. We call the resulting curve in the graph, the trace of $E_d$. An example of such a graph is illustrated in FIG. 2.

According to the present invention, any ranking model may be extended to include a set of temporal events. According to a specific embodiments, this may be done by considering only word queries. Let $r=r(d, q_W)$ be the normalized ranking (weight) of a given full-text retrieval system for document d when the query is $q_W$ (that is $0 \leq r \leq 1$). A new time-based ranking, tr, may then be computed using $tr(d, q_W)=r(d, q_W) \times M(E_d)$. In other words, the best documents will depend on the content as well as the most probable of the associated events.

According to a specific embodiment, a "time query" is defined as a time segment. Thus, the ranking is simply the maximal confidence restricted to the time segment of the query, i.e., $M(E_d \cap q_T)$. See, for example, the trace of FIG. 2 which uses $M(q_T)$ to indicate this case. However, it should be noted that it is possible to define a time query as a set of segments by simply extending the normal Boolean query operations to operate also in time segments. Finally, a complete query combining words and time is ranked using $$tr(d, q)=r(d, q_w) \times M(E_d \cap q_T), \qquad (2)$$

as before.

If $q_T$ is a finite time segment, an alternative ranking can be defined as follows. Let $A=A(E_d \cap q_T)$ be the area under the trace of $E_d$ restricted to the time segment defined by $q_T$. Then, we can use $$tr(d, q)=r(d, q_W) \times A(E_d \cap q_T) \qquad (3)$$

According to yet another alternative, documents may be divided into text scopes, i.e., the portions of text relevant to particular temporal events, each one of them having just one associated temporal event. As will be understood, several other variations are possible.

Operation of a particular implementation will now be described with reference to specific model choices and a specific data sample. According to this example, years are used as the time unit for the time segments. Although a finer granularity is possible, the use of years is particularly meaningful in that most future references were to years with the exception of references to the days immediately following the news item. However, it will be understood that any unit of time may be used without departing from the scope of the invention, e.g., a second, a minute, an hour, a day, a week, a month, a year, a decade, a century, and a millennium, etc.

In this example, the Boolean model is employed as the underlying word ranking model as this approach enables studying the effect of the event confidence model. And for the purpose of simplicity, the confidence model employed in this example is also simple. That is, in this example, there are two confidence levels; one for events that almost surely will happen, and another for possible events. The values 100% and 50% confidence were arbitrarily assigned to those two levels, respectively, although it is recognized that other values might be equally valid.

The data sample for this example was the NIST 1999 information extraction entity recognition evaluation data sample. This data sample includes 94 Associated Press and New York Times articles from 1998 with a total size of 540 Kb. Each article contains tags for date, headline, and text context. In addition, these data are already tagged for two temporal entities: dates and durations. For the purpose of illustration, the data was filtered to extract only the articles that referenced the future, removing other tagged entities. This reduced the data set to 45 articles with a size of 187 Kb. Time segments and confidence levels were then added to each article. It should be noted that this data sample is being referenced herein merely as an example to illustrate the operation of a specific embodiment of the invention. The techniques of the present invention are much more widely applicable and may be used with much larger and more comprehensive data samples which may or may not be already tagged or pre-processed in any particular way.

In this sample, about 87% of the news having references to the future were in the same year (and many to the closely following days). However, 44% of them had some reference to the next two years, and 31% to three or more years later up to the year 2020. The estimation for the web-based news service mentioned above gives around 62% and 36% for the last two percentages, respectively (the remaining items were after 2020). Regarding the confidence levels, 66% were scheduled events which almost surely would happen (all but one of them were for the same year), while the possible events referenced in half of the cases to two or more years ahead. So, as expected, there is a high correlation between confidence level and event proximity.

For this exemplary implementation, public XML search toolkit which allows Boolean full-text search in XML data was used. This software runs in a PC under Linux environment, i.e., the development environment for this implementation. Each news article was represented by an XML segment having four tagged fields: title, body, $E_d$ (in years), and $M(E_d)$. It will be understood, however, that embodiments of the present invention may be implemented using any of a wide variety of document formats, software tools, computing paradigms, development environments, and network configurations. Some embodiments of the present invention may be implemented as computer program products comprising at least one computer-readable storage medium having computer program instructions stored therein which are operable to cause at least one computing device to perform various of the functionalities described herein. Therefore the present invention should not be limited by references to these specific examples.

In this example, time segments were expanded to all years in the data as well as in the queries. A query was evaluated by intersecting a full-text search in the title and body tags content with a full-text search for any of the years in the $E_d$ tag content. The ranking was obtained by sorting the answers using the $M(E_d)$ tag content and the title tag content as a secondary key, i.e., confidence ties were given in alphabetical order.

According to the exemplary embodiment, a simple input form allows a user to enter a text query (optional) and the time segment (e.g., the year). The output was a simple HTML page showing the numerical ranking, headline, and confidence level as illustrated by the three query examples shown in FIGS. 3-5. In the example shown in FIG. 5, the first two headlines are the same although the corresponding news items are different. That is, one is about the Malaysian economy, and the other is about the Commonwealth Games.

The foregoing description makes it clear that a future retrieval system is not only feasible, but that the results of such a system may be used for a variety of purposes such as, for example, to support decision making in commercial or political contexts. In addition, future retrieval systems designed in accordance with the present invention may also be used for advanced forensic search by extending the search capabilities to past temporal entities.

While the invention has been particularly shown and described with reference to specific embodiments thereof, it will be understood by those skilled in the art that changes in the form and details of the disclosed embodiments may be made without departing from the spirit or scope of the invention. For example, embodiments are contemplated in which the response (e.g., search results) of a future retrieval system are evaluated for the purpose of iteratively improving system performance. For example, such evaluation could involve evaluating whether events actually happened and comparing such event occurrence data with the a priori confidence levels associated with those events. The ranking also can be improved by using machine learning techniques on such evaluation data.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A future retrieval system operable to enable searching for future events associated with a set of documents, comprising:
   at least one memory device configured to store a database which includes the documents; and
   at least one computing device configured to:
      identify one or more future events associated with each of the documents, at least some of the documents having a plurality of the future events associated therewith;
      generate temporal data and a confidence value for each future event, the temporal data for each future event comprising a time segment, the confidence value representing a likelihood of occurrence for the corresponding future event and being determined with reference to text associated with the corresponding future event by identifying one or both of a verb tense or verb mood for the associated text, each future event corresponding to a tuple of the corresponding time segment and confidence value;
      identify a text scope for at least some of the future events, the text scope corresponding to a subset of the document with which the corresponding future event is associated;

evaluate the text associated with the future events to generate event metadata for each future event;

index the subsets of the documents corresponding to each future event with the corresponding event metadata, and the corresponding tuple of the corresponding time segment and confidence value in the database; and generate search results corresponding to selected ones of the documents in the database in response to queries which include references to future times, and to rank the search results in accordance with the confidence values associated with the future events associated with the selected documents.

2. The future retrieval system of claim 1 wherein the at least one computing device is configured to use a natural language processing technique to identify the verb mood for each of the future events.

3. The future retrieval system of claim 1 wherein the at least one computing device is configured to identify one or both of the verb tense or verb mood by identifying one or more of will, must, should, could, or would in the text.

4. The future retrieval system of claim 1 wherein the temporal data comprises one or more of a second, a minute, an hour, a day, a week, a month, a year, a decade, a century, or a millennium.

5. The future retrieval system of claim 1 wherein selected ones of the queries include one or more keywords, the at least one computing device further being configured to rank the search results in accordance with relevance of the selected documents with respect to the one or more keywords.

6. The future retrieval system of claim 1 wherein selected ones of the queries include only the references to the future times, and the selected documents corresponding to the search results include any of the documents referring to the future times.

7. The future retrieval system of claim 1 wherein first ones of the documents each have a plurality of the future events associated therewith, the at least one computing device further being configured to generate rank values for each of the first documents with reference to a most likely to occur one of the plurality of associated future events.

8. The future retrieval system of claim 1 wherein the at least one computing device is further configured to generate a ranking value for a first one of the selected documents in response to a first query identifying a time segment, the ranking value being determined with reference to a maximum confidence value associated with the first selected document restricted to the time segment.

9. The future retrieval system of claim 1 wherein a first one of the selected documents has a plurality of the future events associated therewith, and wherein the at least one computing device is further configured to generate a ranking value for the first selected document in response to a first query identifying a time segment, the ranking value being determined with reference to an intersection of the time segment with a curve representing the plurality of future events associated with the first selected document.

10. The future retrieval system of claim 1 wherein a first one of the documents has a plurality of the future events associated therewith, and wherein the at least one computing device is further configured to divide the first document into a plurality of text passages, each of the text passages being associated with only one of the plurality of future events associated with the first document.

11. A computer-implemented method for enabling searching for future events associated with a set of documents stored in a database on at least one memory device, the method comprising:

identifying one or more future events associated with each of the documents using one or more computing devices, at least some of the documents having a plurality of the future events associated therewith;

generating temporal data and a confidence value for each future event using the one or more computing devices, the temporal data for each future event comprising a time segment, the confidence value representing a likelihood of occurrence for the corresponding future event and being determined with reference to text associated with the corresponding future event by identifying one or both of a verb tense or verb mood for the associated text, each future event corresponding to a tuple of the corresponding time segment and confidence value;

identifying a text scope for at least some of the future events using the one or more computing devices, the text scope corresponding to a subset of the document with which the corresponding future event is associated;

evaluating the text associated with the future events to generate event metadata for each future event using the one or more computing devices;

indexing the subsets of the documents corresponding to each future event with the corresponding event metadata, and the corresponding tuple of the corresponding time segment and confidence value in the database; and generating search results corresponding to selected ones of the documents in the database in response to queries which include references to future times, and ranking the search results in accordance with the confidence values associated with the future events associated with the selected documents.

12. The computer-implemented method of claim 11 wherein identifying one or both of the verb tense or verb mood comprises identifying one or more of will, must, should, could, or would in the text.

13. The computer-implemented method of claim 11 wherein the temporal data comprises one or more of a second, a minute, an hour, a day, a week, a month, a year, a decade, a century, or a millennium.

14. The computer-implemented method of claim 11 wherein selected ones of the queries include one or more keywords, the method further comprising ranking the search results in accordance with relevance of the selected documents with respect to the one or more keywords.

15. The computer-implemented method of claim 11 wherein selected ones of the queries include only the references to the future times, and the selected documents corresponding to the search results include any of the documents referring to the future times.

16. The computer-implemented method of claim 11 wherein first ones of the documents each have a plurality of the future events associated therewith, the method further comprising generating rank values for each of the first documents with reference to a most likely to occur one of the plurality of associated future events.

17. The computer-implemented method of claim 11 further comprising generating a ranking value for a first one of the selected documents in response to a first query identifying a time segment, the ranking value being determined with reference to a maximum confidence value associated with the first selected document restricted to the time segment.

18. The computer-implemented method of claim 11 wherein a first one of the selected documents has a plurality of the future events associated therewith, the method further comprising generating a ranking value for the first selected document in response to a first query identifying a time segment, the ranking value being determined with reference to an intersection of the time segment with a curve representing the plurality of future events associated with the first selected document.

19. The computer-implemented method of claim 11 wherein a first one of the documents has a plurality of the future events associated therewith, the method further comprising dividing the first document into a plurality of text passages, each of the text passages being associated with only one of the plurality of future events associated with the first document.

20. A computer program product for enabling searching for future events associated with a set of documents stored in a database on at least one memory device, the computer program product comprising at least one computer-readable storage medium having computer program instructions stored therein which are operable to cause one or more computing devices to:

identify one or more future events associated with each of the documents, at least some of the documents having a plurality of the future events associated therewith;

generate temporal data and a confidence value for each future event, the temporal data for each future event comprising a time segment, the confidence value representing a likelihood of occurrence for the corresponding future event and being determined with reference to text associated with the corresponding future event by identifying one or both of a verb tense or verb mood for the associated text, each future event corresponding to a tuple of the corresponding time segment and confidence value;

identify a text scope for at least some of the future events, the text scope corresponding to a subset of the document with which the corresponding future event is associated;

evaluate the text associated with the future events to generate event metadata for each future event;

index the subsets of the documents corresponding to each future event with the corresponding event metadata, and the corresponding tuple of the corresponding time segment and confidence value in the database; and generate search results corresponding to selected ones of the documents in the database in response to queries which include references to future times, and to rank the search results in accordance with the confidence values associated with the future events associated with the selected documents.

* * * * *

UNITED STATES PATENT AND TRADEMARK OFFICE
CERTIFICATE OF CORRECTION

PATENT NO.       : 7,668,813 B2                          Page 1 of 1
APPLICATION NO.  : 11/463978
DATED            : February 23, 2010
INVENTOR(S)      : Ricardo Alberto Baeza-Yates It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Seventh Day of December, 2010

David J. Kappos
*Director of the United States Patent and Trademark Office*